United States Patent [19]

O'Neill

[11] Patent Number: 5,524,793
[45] Date of Patent: Jun. 11, 1996

[54] DISPENSING PUMP WHICH IS LOCKABLE AND SEALABLE FOR TRANSPORATION AND STORAGE

[75] Inventor: Kevin O'Neill, Wrightwood, Calif.

[73] Assignee: Emson, Inc., Bridgeport, Conn.

[21] Appl. No.: 278,438

[22] Filed: Jul. 21, 1994

[51] Int. Cl.⁶ .................................................... G01F 11/04
[52] U.S. Cl. .................................. 222/153.13; 222/384
[58] Field of Search ........................... 222/153.13, 321.9, 222/384

[56] References Cited

U.S. PATENT DOCUMENTS

| | | | |
|---|---|---|---|
| 3,128,018 | 4/1964 | Corsette et al. | 222/153.13 |
| 3,237,571 | 3/1966 | Corsette | 222/321.9 X |
| 3,248,021 | 4/1966 | Corsette et al. | 222/153.13 |
| 3,359,917 | 12/1967 | Cooprider | 222/321.9 X |
| 3,361,078 | 1/1968 | Cooprider | 222/153.13 X |
| 3,362,344 | 1/1968 | Duda | 222/321.9 X |
| 3,949,906 | 4/1976 | Petterson et al. | |
| 4,096,085 | 1/1985 | Ford et al. | |
| 4,286,736 | 9/1981 | Corsette | |
| 4,340,158 | 7/1982 | Ford et al. | 222/153.13 |
| 4,369,899 | 1/1983 | Magers et al. | 222/153.13 |
| 4,375,266 | 3/1983 | Magers | |
| 4,479,589 | 10/1984 | Ford | |
| 4,512,501 | 4/1985 | Foster | |
| 4,524,888 | 6/1985 | Tada | 222/153.13 X |
| 5,016,780 | 5/1991 | Moretti | 222/153.13 |
| 5,096,094 | 3/1992 | Guilbert | |
| 5,219,098 | 6/1993 | Tada | |
| 5,222,632 | 6/1993 | Tada | |

FOREIGN PATENT DOCUMENTS

| | | |
|---|---|---|
| 823037 | 9/1969 | Canada. |
| 60-166769 | 8/1985 | Japan. |
| 4-267757 | 9/1992 | Japan. |

Primary Examiner—Kevin P. Shaver
Attorney, Agent, or Firm—Kenyon & Kenyon

[57] ABSTRACT

A pump dispenser, useful especially for lotions, soaps and creams, has a structure which allows locking into a sealed and locked position. The pump dispenser may therefore be transported and stored without fear of accidental actuation or leakage. The dispenser has a valve stem which acts as an inlet valve, as well as a mechanism for sealing the inlet and outlet to the pump chamber when locked. The pump dispenser also has structure to seal the vent passage when in a locked position.

20 Claims, 7 Drawing Sheets

DISPENSING PUMP WHICH IS LOCKABLE AND SEALABLE FOR TRANSPORATION AND STORAGE

BACKGROUND OF THE INVENTION

1. Field of the Invention

The present invention relates to a dispensing pump in which the pump mechanism can be placed into a locked and sealed position for transport or storage. The pump is especially useful for dispensing viscous products such as lotions, soaps or creams.

2. Description of the Related Art

It is known in the art to provide dispensing pumps, especially pumps for lotions, soaps or creams, in which the actuator and piston structure can be placed in a locked position for transportation or storage. Often, these devices include locking structures between the actuator and the mounting cap so that the actuator, and the accompanying pump structure, are locked in a depressed position as a result of cooperation between the locking structures on the actuator and the mounting cap. Devices of this type are shown in U.S. Pat. Nos. 3,237,571; 3,359,917; 3,362,344; 4,286,736; 4,371,099; and 4,384,660 and Canadian Patent No. 823,037. Pumps which include a feature for sealing the pump structure against leakage in a transport position are shown in U.S. Pat. Nos. 3,949,906; 4,369,899; 4,375,266; 4,479,589; 4,496,085; 4,512,501; 4,524,888; and 5,096,094 and Japanese Publication Nos. 60-166769 and 4-267757.

SUMMARY OF THE INVENTION

It is an object of the present invention to provide a pump dispenser which may be locked in a depressed position for transportation and storage, and which seals the interior of the pump and the product container against leakage during transportation. It is a further object of the present invention to design a dispenser which provides desirable sealing and locking characteristics, while using a minimum number of parts, and while providing a pump dispenser which is easy and economical to manufacture.

The present invention is structured as a dispensing pump having a internal valve stem structure which acts as an inlet valve during operation and which also seals both the pump inlet and the pump outlet during transportation and storage when in a locked position. The pump also includes structure for sealing the vent opening of the container during transportation and storage in a locked position. The configuration of the valve stem within the pump structure makes it economical and simple to manufacture and assemble, and provides good sealing properties during transportation.

Figure 5:
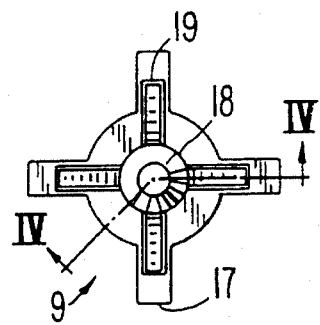
Figure 6:
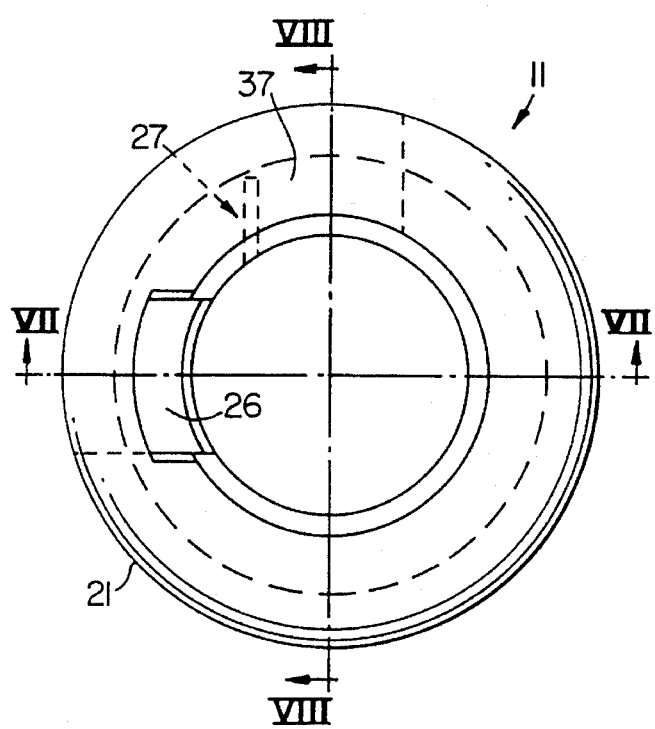
Figure 8:
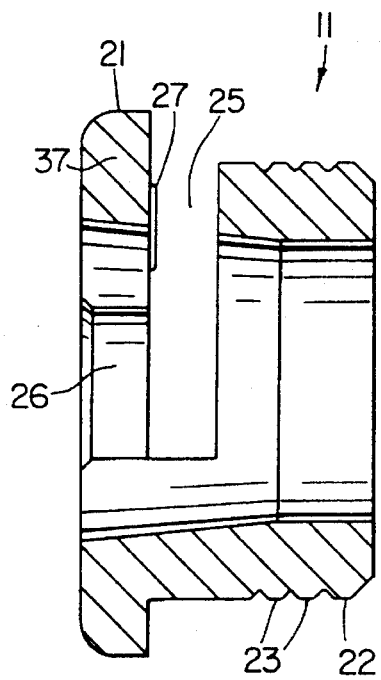
Figure 7:
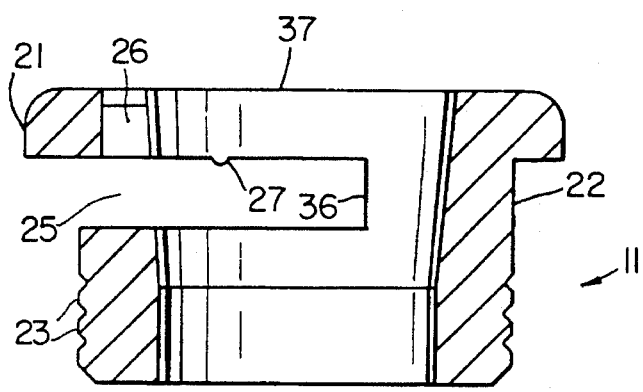
Figure 9:
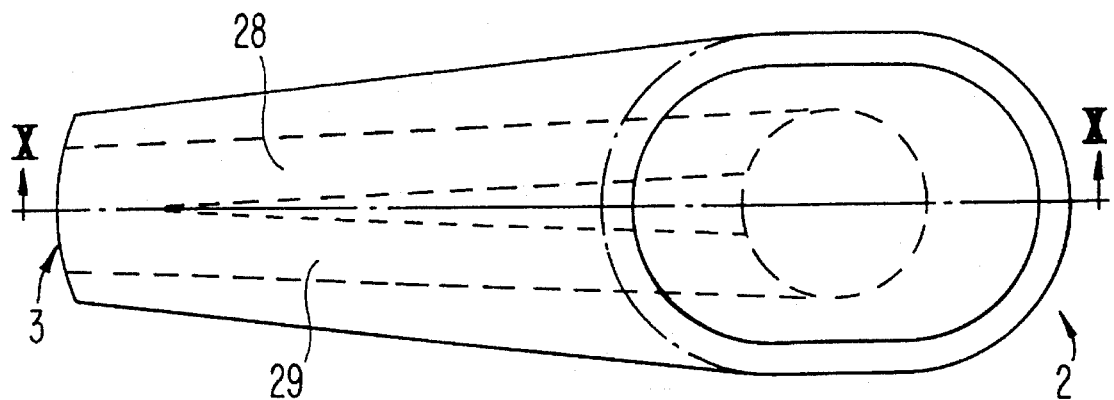
Figure 10:
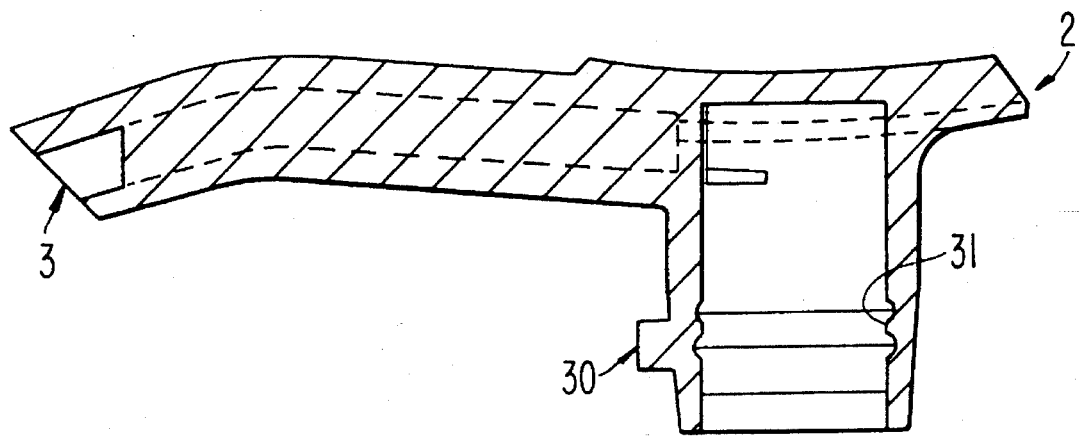

Fig: 4 is a detail cross-sectional view, through line IV—IV of FIG. 5, of the valve stem of the present invention;

FIG. 5 is a top view of the valve stem of the present invention;

FIG. 6 is a top view of the retainer structure of the present invention;

FIG. 7 is a cross-sectional view, through line VII—VII of FIG. 6, of the retainer structure of the present invention;

FIG. 8 is a cross-sectional view, through line VIII—VIII of FIG. 6, of the retainer structure of the present invention;

FIG. 9 is a top view of the actuating head of the present invention;

FIG. 10 is a cross-sectional view, through line X—X of FIG. 9, of the actuating head of the present invention.

Figure 11:
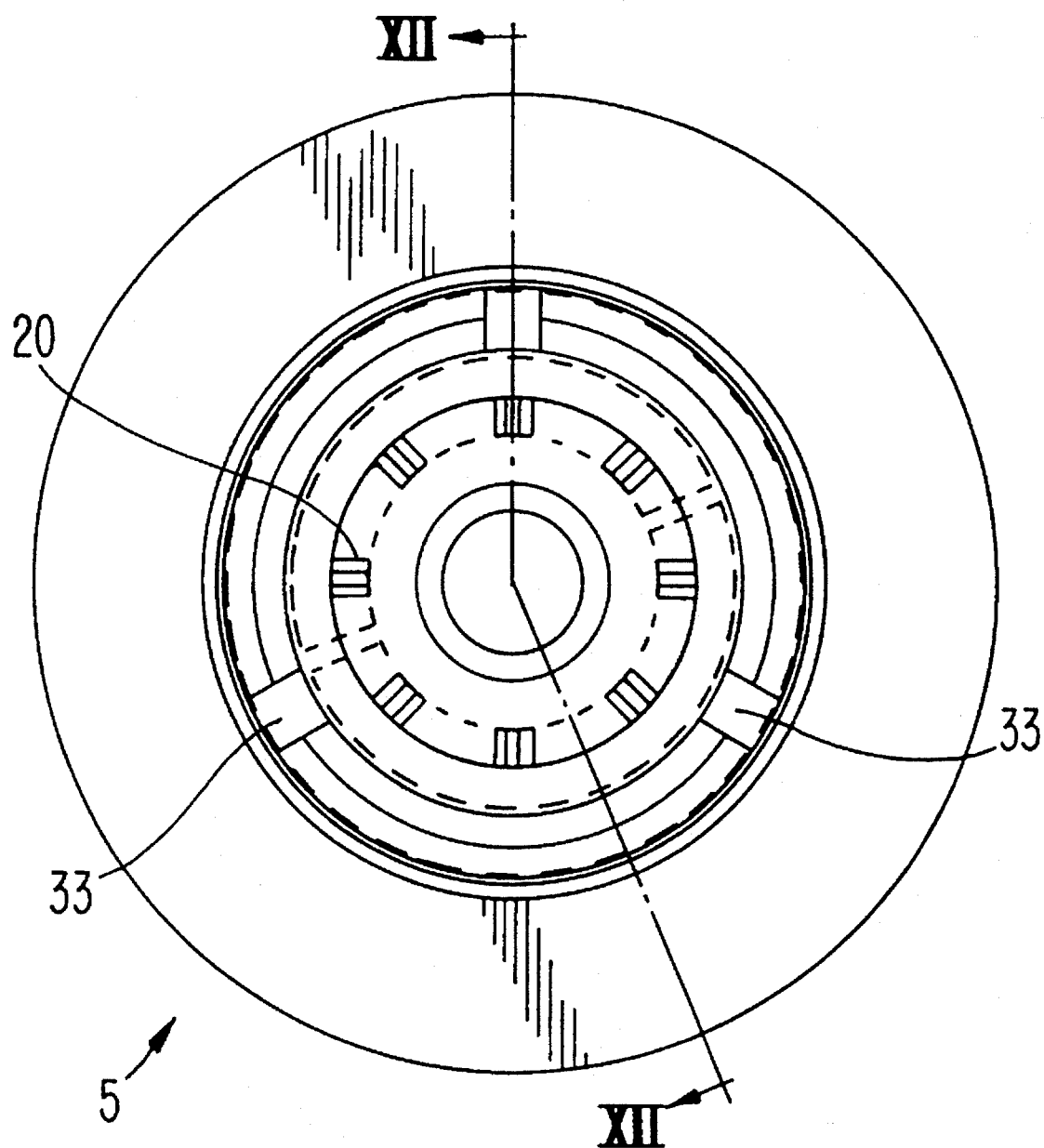

FIG. 11 is a top view of the accumulator of the present invention; and

Figure 12:
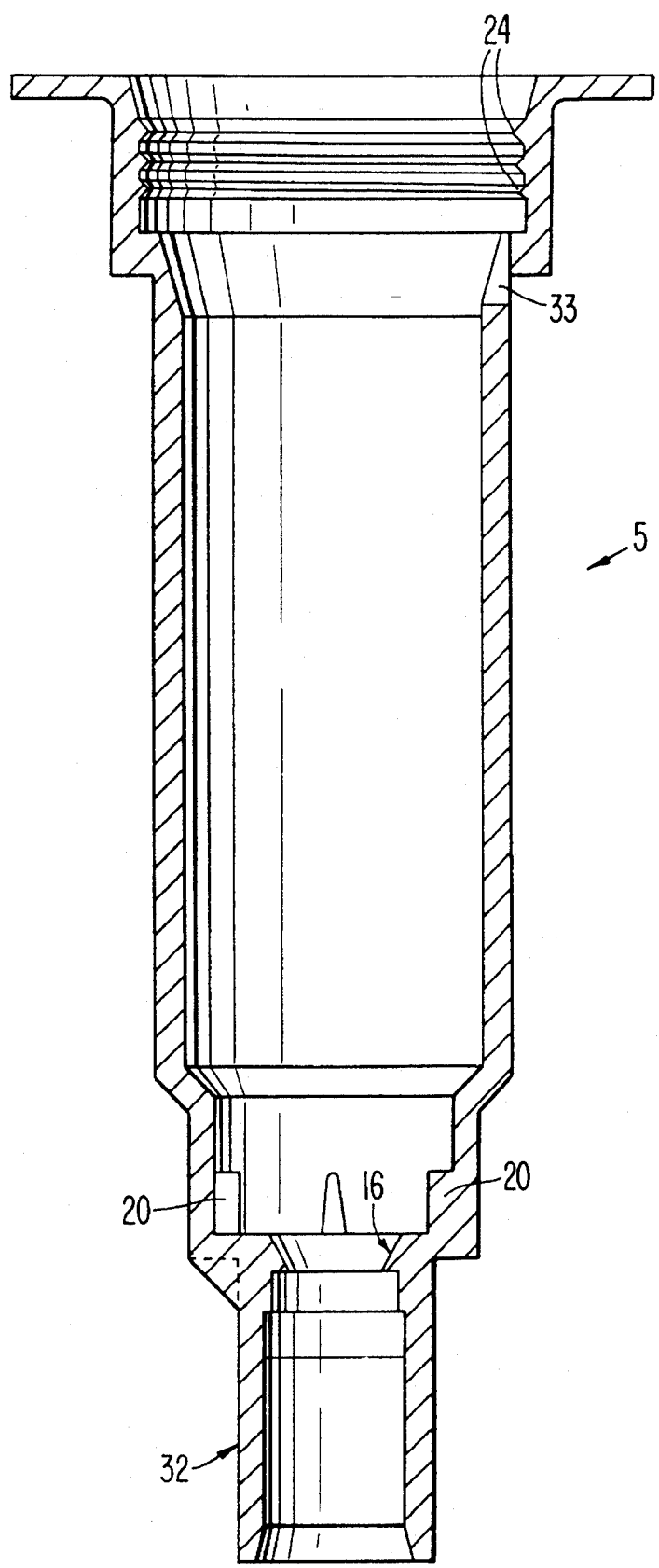

FIG. 12 is a cross-sectional view, through line XII—XII of FIG. 11, of the accumulator of the present invention.

DETAILED DESCRIPTION OF THE INVENTION

Figure 1:
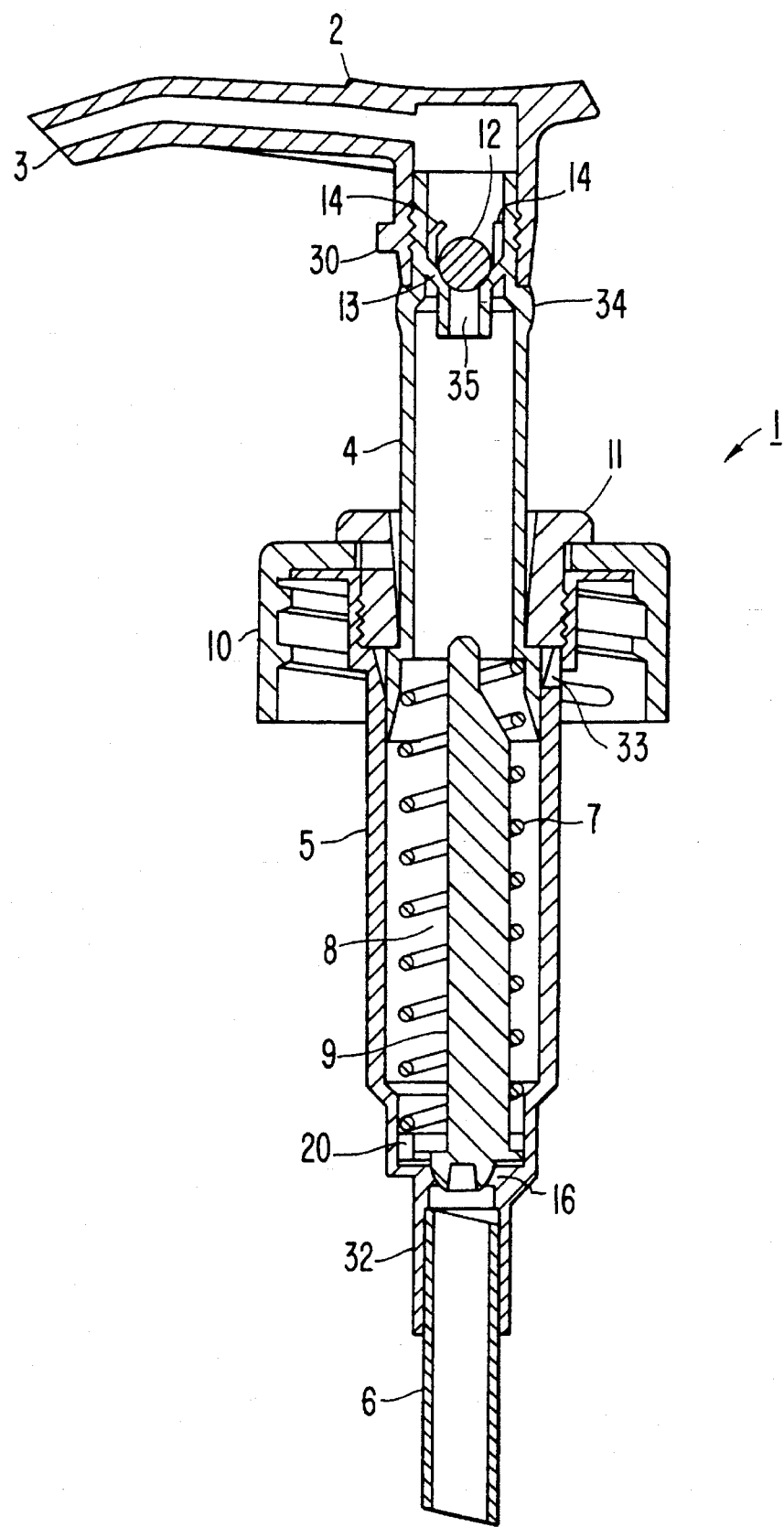
FIG. 1 is a cross-sectional side view of the pump dispenser of the present invention, in an unlocked position.

FIG. 1 shows the pump dispenser 1 of the present invention in an unlocked position, wherein the pump dispenser 1 may be actuated for dispensing. The pump dispenser 1 includes an actuating head 2 which includes a dispensing nozzle 3. Actuating head 2 is mounted on a pump piston 4, which is mounted for reciprocating motion in a pump housing or accumulator 5. At the lower end of accumulator 5 is mounted a dip tube 6, which extends into the lower portion of a bottle or container (not shown) for drawing liquid into the accumulator 5. The pump piston 4 is biased towards the position shown in FIG. 1 by a compression spring 7, which at an upper end contacts the bottom of pump piston 4 and at a lower end contacts a series of shoulders 20 on the lower end of accumulator 5. The pump piston 4 and accumulator 5 together define a pump chamber 8. Within pump chamber 8 is a valve stem 9. Mounted to the upper end of accumulator 5 is a mounting cap 10 for mounting the pump dispenser 1 on a container or bottle, and a retainer structure 11 for retaining the pump dispenser 1 in a sealed and locked position. In a space defined between the upper end of the pump piston 4 and the lower end of the actuating head 2 is an outlet valve ball 12. Ball 12 seats against a conical valve seat 13 on the upper end of pump piston 4, and is preferably gravity biased against the valve seat 13, thereby to form an outlet check valve for pump chamber 8. Ball 12 is retained adjacent the valve seat 13 by retaining beads 14 on the upper end of pump piston 4.

Figure 3:
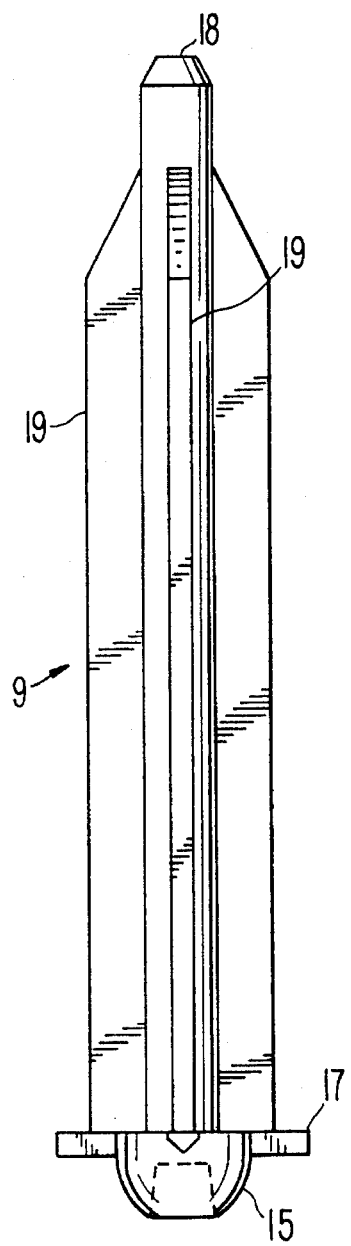
FIG. 3 is a detail side view of the valve stem of the present invention.
Figure 4:
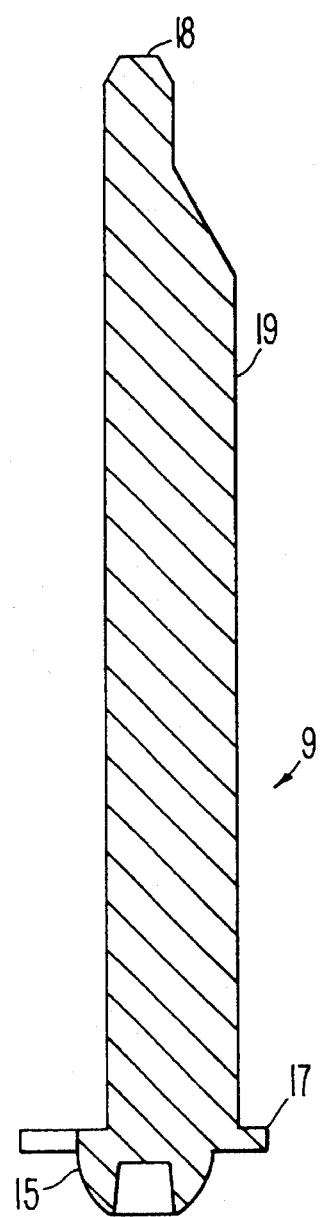

FIGS. 3–5 show the details of the structure of the valve stem 9. The lower end of valve stem 9 contains a valve surface 15, generally of a spherical shape. Valve surface 15, is preferably gravity biased against a conical valve seat 16 on the lower end of accumulator 5, thereby to form an inlet valve for pump chamber 8. The valve surface 15 is retained adjacent the valve seat 16 by interaction between the lower end of the spring 7 and projecting flanges 17 on valve stem 9. Upper end of valve stem 9 includes a sealing boss 18, which as described below, is used to seal the outlet to the pump chamber 8 when the pump is in a locked position. Valve stem 9 also includes stabilizing fins 19, which are positioned closely adjacent spring 7 to stabilize the valve stem 9 in an upright, substantially vertical, position within pump chamber 8.

FIGS. 6–8 show the details of the retainer structure 11 of the present invention. Retainer structure 11 includes a positioning flange 21, the lower surface of which cooperates with the upper surface of mounting cap 10 to position the mounting cap 10 on the dispensing pump 1. Retainer structure 11 also includes a retention hub 22, which is frictionally fit within the upper end of accumulator 5 to thereby retain the mounting cap 10 on the dispensing pump 1. The frictional fit of retainer structure 11 in accumulator 5 is enhanced by the provision of retention beads 23 on the outer surface of retention hub 22, which interengage with retention beads 24 on the upper end of accumulator 5. Retainer structure 11 contains a lock slot 25, designed to lock pump dispenser 1 into a sealed and locked position. Retainer structure 11 also contains an access slot 26, which is connected to lock slot 25 at its lower end. On an upper surface of lock slot 25, in a position spaced circumferentially from access slot 26, is a snap bead 27. Snap bead 27, as described below, gives a tactile indication of when the pump dispenser 1 is in a locked position.

FIGS. 9 and 10 show one configuration of the actuating head 2 of the present invention. Actuating head 2 can include two channels 28, 29 leading to dispensing nozzle 3. Actuating head 2, near its lower end, also contains a lock projection 30, which cooperates with lock slot 25, as described below, to lock the pump dispenser 1 into a locked and sealed position. The interior of actuating head 2 can contain retention beads 31 which cooperate with retention beads on the upper end of the pump piston 4 to retain the actuating head 2 on the pump piston 4.

Figure 2:
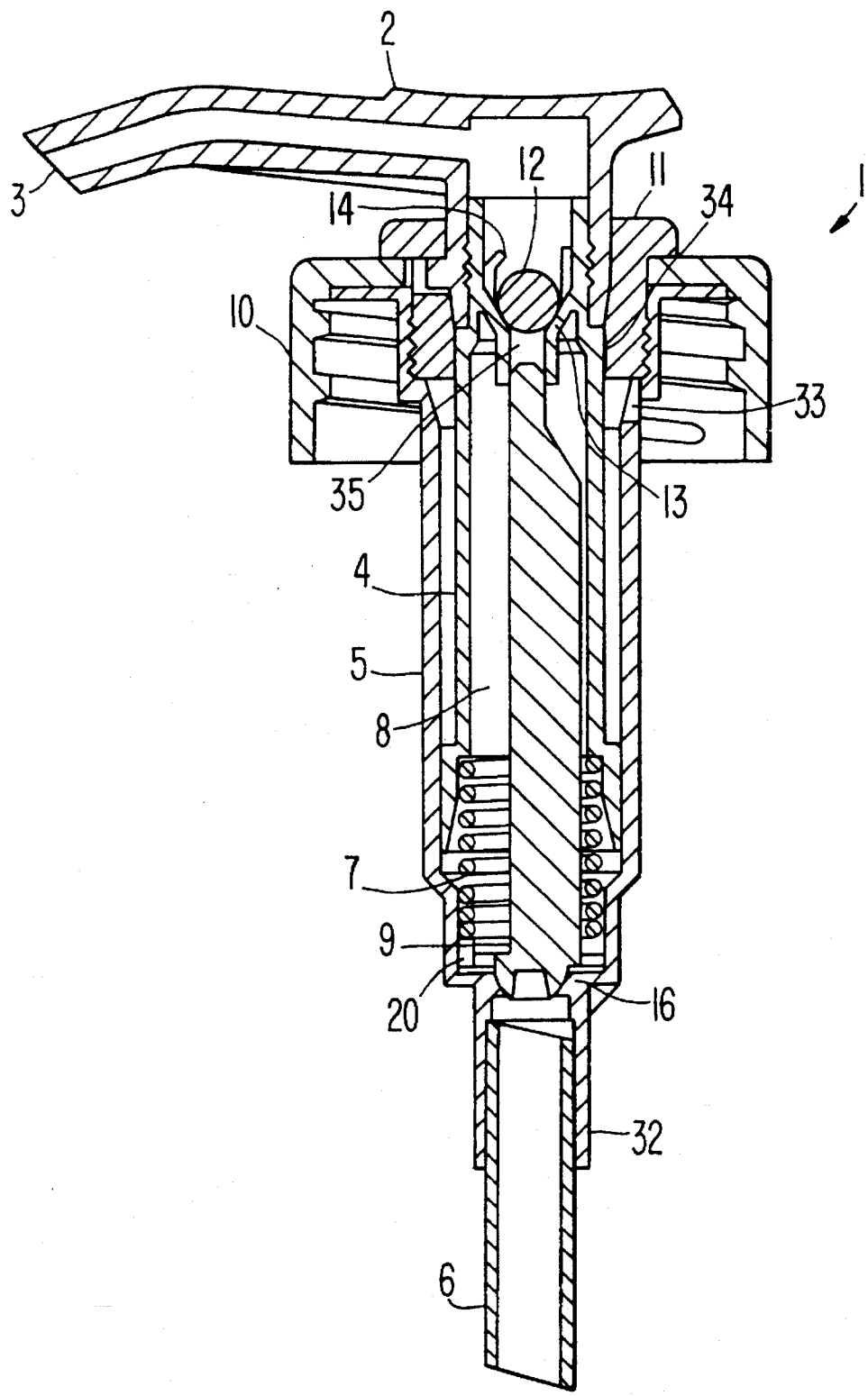
FIG. 2 is a cross-sectional side view of the pump dispenser of FIG. 1, in a locked position.

FIGS. 11 and 12 show the accumulator 5 of the present invention. The accumulator 5 contains a projection 32 at its lower end to retain dip tube 6. The accumulator 5 also contains, on the interior of its lower end, valve seat 16 and shoulders 20, which cooperate, respectively, with valve stem 9 to create an inlet valve and with spring 7 to restrain upward movement of valve stem 9. Upper end of accumulator 5 includes at least one vent slot 33, which in a manner known in the art allows atmospheric pressure to enter the bottle or container during the suction stroke of the pump dispenser 1. As can be seen in FIG. 1, the piston 4 seals against the bottom of retention structure 11 in the fully extended position of the piston 4, to prevent leakage through vent slots 33. Furthermore, as can be seen in FIG. 2, a sealing bead 34 on the upper end of piston 4 seals against the interior surface of retention structure 11 in the fully depressed position of the piston 4, to prevent leakage through vent slots 33 when the pump dispenser is in a sealed and locked position.

Operation of the pump dispenser 1 of the present invention is as follows. If dispensing of the contents of the bottle or container is desired, the actuating head 2 is depressed from the position shown in FIG. 1. Depression of actuating head 2 causes piston 4 to move downwardly, reducing the volume of pump chamber 8 and thereby increasing the pressure of liquid in pump chamber 8, since the inlet valve formed by the cooperation of valve surface 15 and valve seat 16 is closed due to the force of gravity on valve stem 9. Increased pressure of the liquid in pump chamber 8 drives it through passage 35 in pump piston 4, unseating ball 12 from valve seat 13. Liquid therefore passes through channels 28, 29 and out dispensing nozzle 3. When actuating head 2 is released, spring 7 drives pump piston 4 upwardly, reducing the volume of pump chamber 8 and thereby reducing the pressure in pump chamber 8 to below atmospheric pressure, because the outlet valve is closed due to the cooperation between gravity-biased ball 12 and valve seat 13. Because of the action of atmospheric pressure on the liquid in the container or bottle, caused by the venting of atmospheric pressure through slots 33 valve spherical surface 15 is unseated from valve seat 16. Liquid therefore is drawn into pump chamber through dip tube 6.

When it is desired to lock pump dispenser into a position in which it will not be operated and will not leak during transportation and storage, actuating head 2 is depressed until projection 30 passes through access slot 26 and into lock slot 25. Actuating head 2 is then rotated until projection 30 passes snap bead 27, "clicking" into place between snap bead 27 and surface 36 of lock slot 25. In this position, portion 37 of retainer structure 11 prevents upward movement of projection 30, thereby locking piston 4 and actuating head 2 in the position shown in FIG. 2. As can be seen in FIG. 2, the pump dispenser 1 is sealed against leakage at three points. First, sealing bead 34 seals against the interior surface of retention structure 11 to prevent leakage through vent slots 33. Second, sealing boss 18 enters into passage 35 and seals against the interior surface of passage 35, thereby sealing the outlet of pump chamber 8. Finally, the interaction between sealing boss 18 and passage 35 pushes valve stem 9 downwardly, so that valve surface 15 seals tightly against valve seat 16, thereby sealing the inlet of pump chamber 8. As a result, the pump is effectively sealed against leakage and is locked against actuation until the actuating head 2 is rotated by a user so that projection 30 may pass through access slot 26 to allow pump operation, as described above.

I claim:

1. A pump dispenser comprising:

an accumulator;

a piston mounted for reciprocation in said accumulator from a fully extended position to a fully depressed position, said piston and said accumulator defining a pump chamber;

an outlet valve for said pump chamber;

a spring for biasing said piston; and a valve stem mounted within said pump chamber, said valve stem comprising a valve surface cooperating with an inlet valve seat thereby to form an inlet valve for said pump chamber, said valve stem further comprising an axially outward terminal end cooperating with an outlet of said pump chamber only in said fully depressed position of said piston, said axially outward terminal end sealing said outlet only in said fully depressed position.

2. The pump dispenser of claim 1, further comprising:

a retainer structure connected to said accumulator, said retainer structure cooperating with a locking portion connected to said piston, thereby to lock said piston in said depressed position.

3. The pump dispenser of claim 2, further comprising:

an actuating head connected to said piston, said actuating head comprising said locking portion, said locking portion comprising a projection, said retainer structure comprising a lock slot.

4. The pump dispenser of claim 3, wherein:

said retainer structure comprises an access slot, said projection passing through said access slot in an axial direction and said projection passing through said lock slot in a circumferential direction, thereby to lock said piston in said depressed position.

5. The pump dispenser of claim 2, wherein:

said accumulator comprises a vent slot, said piston comprising a sealing bead, said sealing bead sealing against said retainer structure in said depressed position to thereby seal said vent slot.

6. The pump dispenser of claim 1, wherein:

said outlet valve comprises a ball valve.

7. The pump dispenser of claim 1, wherein:

said axially outward terminal end comprises a boss, said boss entering an outlet passage in said piston only in said fully depressed position to thereby seal said outlet passage.

8. A pump dispenser comprising:

an accumulator, said accumulator comprising an inlet;

a pump piston reciprocable in said accumulator between a fully extended position and a fully depressed position, said pump piston comprising an outlet;

a spring biasing said pump piston;

a head mounted on said piston;

a stem, said stem being located between said pump piston and said accumulator, said stem comprising a first axially inward terminal end sealable against said inlet and a second axially outward terminal end sealable against said outlet, said first end sealing said inlet in said fully extended position of said pump piston in said accumulator, and both said first end sealing said inlet and said second end sealing said outlet only in said fully depressed position of said pump piston in said accumulator.

9. The pump dispenser of claim 8, further comprising:

a retention structure, said retention structure comprising a slot, said head further comprising a projection, said slot and said projection cooperating to lock said pump piston in said fully depressed position.

10. The pump dispenser of claim 9, wherein:

said pump piston further comprising a sealing element, said sealing element sealing against said retention structure in said fully depressed position.

11. The pump dispenser of claim 8, further comprising:

a check valve, said check valve sealing said outlet in said fully extended position.

12. The pump dispenser of claim 8, wherein:

said stem further comprises stabilizing fins.

13. The pump dispenser of claim 8, wherein:

said spring comprises an axially inner end, said axially inner end of said spring restraining axially outward movement of said stem.

14. The pump dispenser of claim 8, wherein:

said second end comprises a boss.

15. The pump dispenser of claim 8, wherein:

said first end comprises a spherical surface.

16. A pump dispenser comprising:

an accumulator, said accumulator comprising an inlet, said accumulator further comprising a inlet valve seat;

a pump piston reciprocable in said accumulator between a fully extended position and a fully depressed position, said pump piston comprising an outlet, said pump piston further comprising an outlet valve seat and a passage axially inward of said outlet valve seat;

a spring biasing said pump piston;

a head mounted on said piston;

a stem, said stem being located between said pump piston and said accumulator, said stem comprising a first axially inward terminal end, said first end comprising an inlet valve sealable against said inlet valve seat, said stem further comprising a second axially outward terminal end, said second end being insertable into said passage only in said fully depressed position to seal said passage and to connect said piston and said stem, said first end sealing said inlet in said fully extended position of said pump piston in said accumulator, and both said first end sealing said inlet and said second end sealing said passage only in a fully depressed position of said pump piston in said accumulator; and an outlet valve sealable against said outlet valve seat, said outlet valve and said outlet valve seat being separate from said stem.

17. The pump dispenser of claim 16, further comprising:

a locking portion on said head, said locking portion comprising a projection; and a retainer structure connected to said accumulator, said retainer structure comprising a lock slot, said projection cooperating with said lock slot to thereby to lock said piston in said depressed position.

18. The pump dispenser of claim 17, wherein:

said retainer structure comprises an access slot, said projection passing through said access slot in an axial direction and said projection passing through said lock slot in a circumferential direction, thereby to lock said piston in said depressed position.

19. The pump dispenser of claim 16, wherein:

said stem further comprises stabilizing fins.

20. The pump dispenser of claim 16, wherein:

said outlet valve is a ball valve.

\* \* \* \* \*